(12) United States Patent
Lin

(10) Patent No.: US 11,673,624 B2
(45) Date of Patent: Jun. 13, 2023

(54) STRUCTURE FOR LOCKING THE CABLE OF BICYCLE

(71) Applicant: SUN RACE STURMEY-ARCHER INC., Taoyuan (TW)

(72) Inventor: Jhen-Ming Lin, Taoyuan (TW)

(73) Assignee: SUN RACE STURMEY-ARCHER INC., Taoyuan (TW)

(*) Notice: Subject to any disclaimer, the term of this patent is extended or adjusted under 35 U.S.C. 154(b) by 0 days.

(21) Appl. No.: 17/393,369

(22) Filed: Aug. 3, 2021

(65) Prior Publication Data

US 2022/0048594 A1 Feb. 17, 2022

(30) Foreign Application Priority Data

Aug. 12, 2020 (TW) .................................. 109127291

(51) Int. Cl.
*B62M 9/127* (2010.01)
*B62L 3/02* (2006.01)
(52) U.S. Cl.
CPC ............... *B62M 9/127* (2013.01); *B62L 3/02* (2013.01)
(58) Field of Classification Search
CPC ......... B62M 9/127; B62M 25/04; B62L 3/02; B62J 11/13
See application file for complete search history.

(56) References Cited

U.S. PATENT DOCUMENTS

| 6,079,523 | A | * | 6/2000 | Irvine | ...................... | B62L 3/02 |
|  |  |  |  |  |  | 188/24.12 |
| 2011/0224037 | A1 | * | 9/2011 | Auer | ...................... | B62M 9/137 |
|  |  |  |  |  |  | 474/82 |
| 2013/0085026 | A1 | * | 4/2013 | Kuwayama | ............ | B62M 9/131 |
|  |  |  |  |  |  | 474/80 |
| 2013/0292213 | A1 | * | 11/2013 | Coombes | .................. | B62L 3/04 |
|  |  |  |  |  |  | 188/24.11 |

FOREIGN PATENT DOCUMENTS

| CN | 2295669 Y | 10/1998 |
|---|---|---|
| CN | 101557043 A | 10/2009 |

(Continued)

OTHER PUBLICATIONS

Global Patent Search System Machine Translation of TW431404U, Cai, Apr. 21, 2001 (Year: 2001).*

(Continued)

*Primary Examiner* — Vinh Luong
(74) *Attorney, Agent, or Firm* — Huan-Yi Lin

(57) ABSTRACT

A cable clamping mechanism for a bicycle comprises a linkage member, a fixing screw, a nut and a linkage cable. The linkage member includes a first surface and a second surface. A through hole on the linkage member passes through the first surface and the second surface. The fixing screw is provided in the through hole and includes a cable hole passing through a radial direction of the fixing screw, where in the cable hole is on a side of the second surface. The nut joints a bottom end of the fixing screw. The linkage cable passes through the cable hole. The nut presses against (Continued)

the linkage cable so as to clamp the linkage cable in the cable hole. the fixing screw is rotatable within the through hole relative to the linkage member so that the linkage cable can also simultaneously rotate relative to the linkage member.

20 Claims, 20 Drawing Sheets

(56) References Cited

FOREIGN PATENT DOCUMENTS

| | | | |
|---|---|---|---|
| CN | 202295181 U | 7/2012 | |
| EP | 1055597 A2 * | 11/2000 | ............ B62M 25/02 |
| TW | 285962 | 9/1996 | |
| TW | 431404 | 4/2001 | |
| TW | M451300 U1 | 4/2013 | |
| TW | M554522 U | 1/2018 | |
| TW | 201825348 A | 7/2018 | |
| WO | WO 2013140891 A1 * | 9/2013 | ............. B62K 19/38 |

OTHER PUBLICATIONS

Global Patent Search System Machine Translation of TW285952, Ji, Nov. 9, 1996 (Year: 1996).*
Machine Translation of WO 2013140891 A1, Sugimoto et al., Sep. 26, 2013 (Year: 2013).*
Taiwan office action issued in TW 109127291 dated Nov. 4, 2020.
"Office Action" dated Oct. 25, 2022, in counterpart CN foreign Application No. 202110926229.8.

* cited by examiner

STRUCTURE FOR LOCKING THE CABLE OF BICYCLE

CROSS-REFERENCE TO RELATED APPLICATION

This application claims priority from Taiwan Patent Application No. 109127291 filed on Aug. 12, 2020, which are hereby incorporated herein by reference in its entirety.

FIELD OF THE INVENTION

The present application relates to a cable clamping mechanism for a bicycle, particularly a cable clamping mechanism which has a linkage cable passing through a fixing screw.

BACKGROUND OF THE INVENTION

As shown in FIGS. 1, 2A, and 2B, in a bicycle, a linkage member 90 acted as a driving member is driven (either tensioning or releasing) by a linkage cable 91 (such as a derailleur cable or a brake cable) to do the subsequent shifting or braking. Hence, it is required to build a good connection relationship between the linkage cable and the linkage member so as to effectively achieve predetermined action.

Most current bicycles include a fixing member 92 which is fastened on the linkage member 90 (as a pressing point P shown in the figures), and the linkage cable 91 is clamped between the fixing member 92 and the linkage member 90. In this clamped manner of the linkage cable 91, it accordingly offsets from a central longitudinal axis of the fixing member 92. When the linkage cable 91 is tensioned or released at the exit point O as shown in the figures, a force is applied to the linkage cable 91 at the pressing point P so that the linkage member 90 is driven and then the linkage cable swings. Thus, the distance between the pressing point P and the exit point O is changed while the linkage cable 91 is bent under tension, and accordingly, the linkage member 91 at the pressing point P is continuously worn. In this case, the lifetime of the linkage cable 91 will not be long and it is required to replace the linkage cable 91 with a new linkage cable 91 after the original linkage cable 91 suffered about ten thousand times of tensioning or releasing.

SUMMARY OF THE INVENTION

In order to solve the aforesaid problems, the present application provides a cable clamping mechanism for a bicycle, comprising: a linkage member, a fixing screw, a nut and a linkage cable. The linkage member includes a first surface and a second surface. A through hole on the linkage member passes through the first surface and the second surface. The fixing screw is provided in the through hole and includes a cable hole passing through a radial direction of the fixing screw. The cable hole is on a side of the second surface. The nut joints a bottom end of the fixing screw. The linkage cable passes through the cable hole. The nut presses against the linkage cable so as to clamp the linkage cable in the cable hole. The fixing screw is rotatable within the through hole relative to the linkage member so that the linkage cable can also simultaneously rotate relative to the linkage member.

In another embodiment, the fixing screw further comprises a fixing member, a first cylinder and a second cylinder. The fixing member includes at least a portion with a dimension which is greater than a diameter of the through hole. The first cylinder has a diameter adapted to the diameter of the through hole and includes a first end connected to the fixing member. The second cylinder is connected to a second end of the first cylinder. The cable hole vertically passes through the second cylinder. The second cylinder has an end which is connected to the nut and is away from the first cylinder. The fixing member abuts against the first surface when the fixing screw passes through the through hole from the first surface of the linkage member, and wherein the first cylinder and the second cylinder pass through the through hole.

In another embodiment, the mechanism further comprises a first stopper provided on the first surface and located on a side of the through hole so that the fixing member is in rotation which is limited by the first stopper when the fixing screw rotates.

In another embodiment, the mechanism further comprises a second stopper provided on a corner on the first surface opposite to the first stopper at another corner on the first surface so that the fixing member is in rotation which is limited by the first stopper and the second stopper when the fixing screw rotates.

In another embodiment, the mechanism further comprises a washer disposed around the fixing screw and abutting against the linkage cable, the nut pressing against the washer and then pressing against the linkage cable so as to clamp the linkage cable within the cable hole.

In another embodiment, the mechanism further comprises a snap ring, wherein the snap ring is disposed around the fixing screw and abuts against the second surface of the linkage member.

In another embodiment, the mechanism further comprises a snap ring, wherein the snap ring is disposed around on the fixing screw and abuts against the second surface of the linkage member.

In another embodiment, the linkage cable is a derailleur cable.

In another embodiment, an end of the derailleur cable is connected to a bicycle shift lever.

In another embodiment, the linkage member is a bicycle derailleur driving linkage.

In another embodiment, the linkage cable is a brake cable.

In another embodiment, an end of the brake cable is connected to a bicycle brake lever.

In another embodiment, the linkage member is a bicycle brake clamp.

DETAILED DESCRIPTION OF THE INVENTION

Below, the exemplary embodiments of the present application are described in detail. Please also refer to the attached drawings and the corresponding description.

Figure 1:
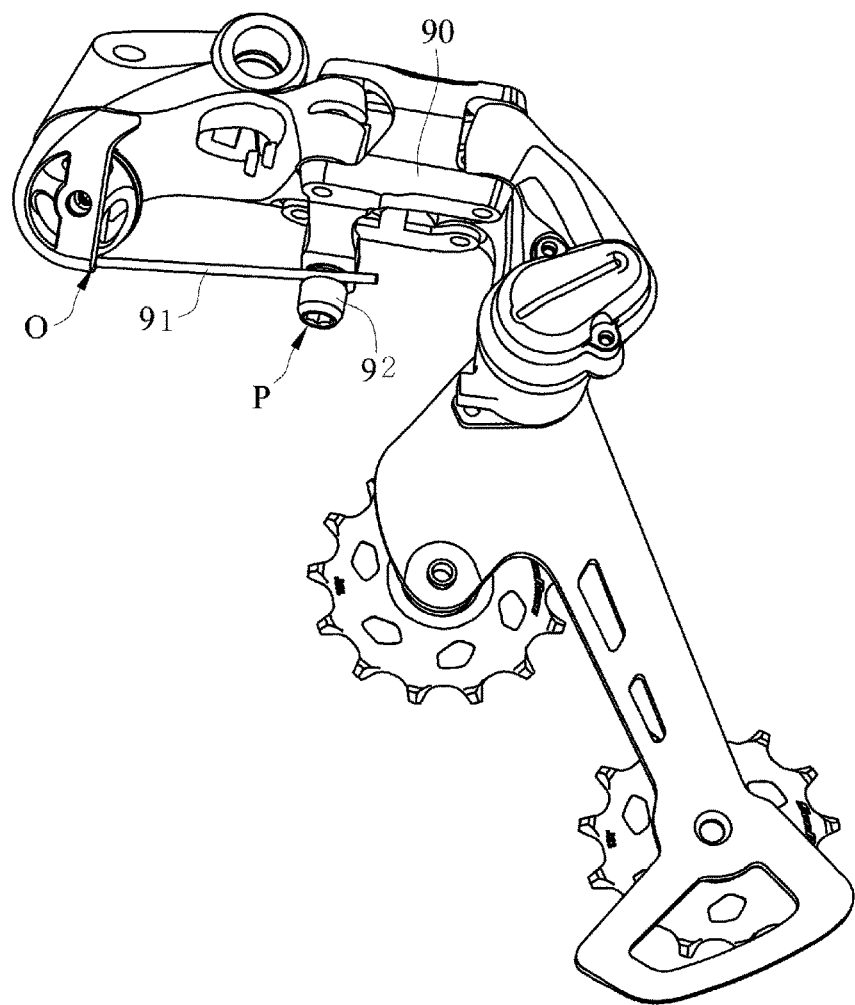
FIG. 1 illustrates a schematic diagram showing the configuration of a linkage cable of prior arts in the bicycle field.
Figure 1:
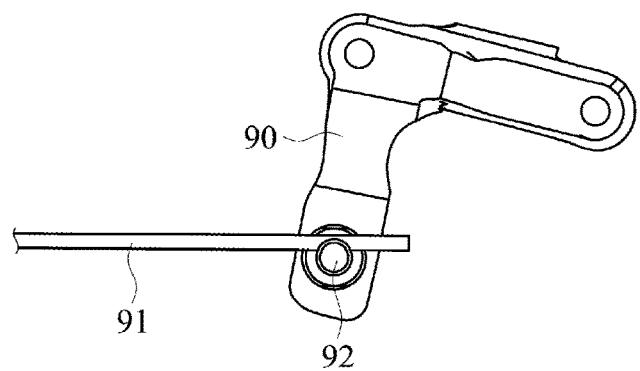
Figure 2A:
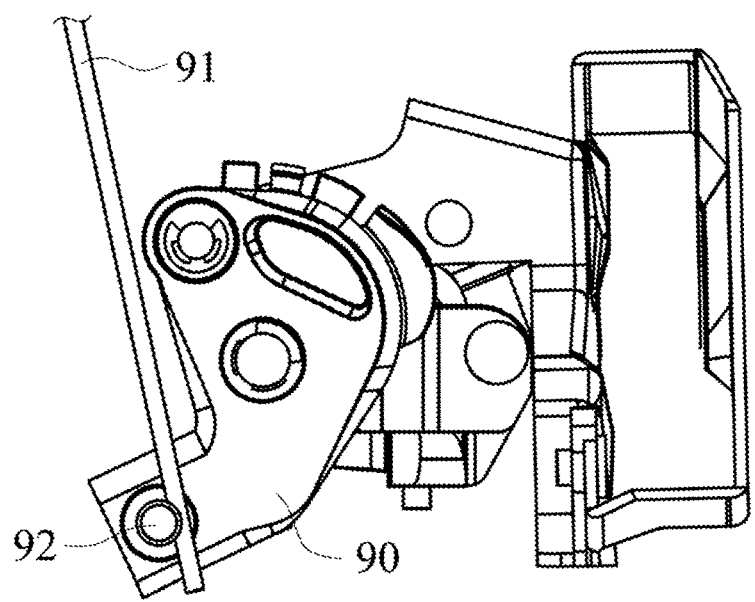
FIG. 2A and FIG. 2B illustrate schematic diagrams showing the action of a conventional linkage cable.
Figure 2B:
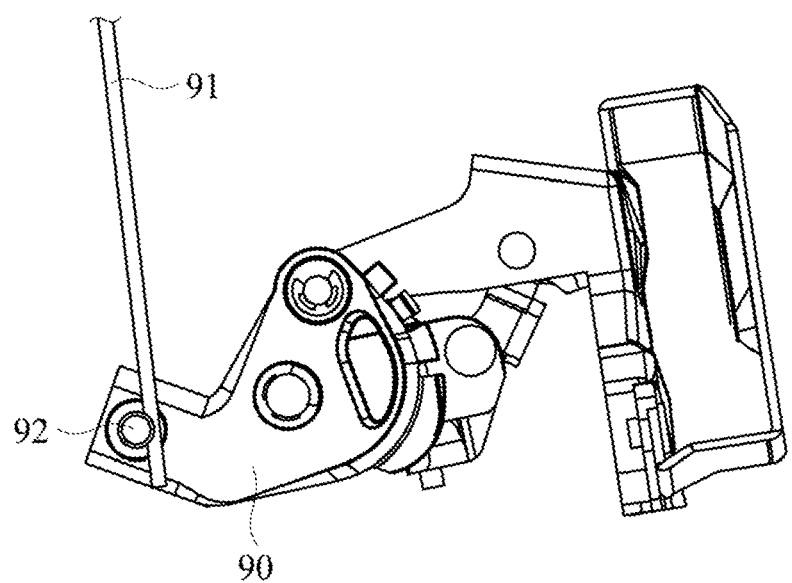
Figure 3:
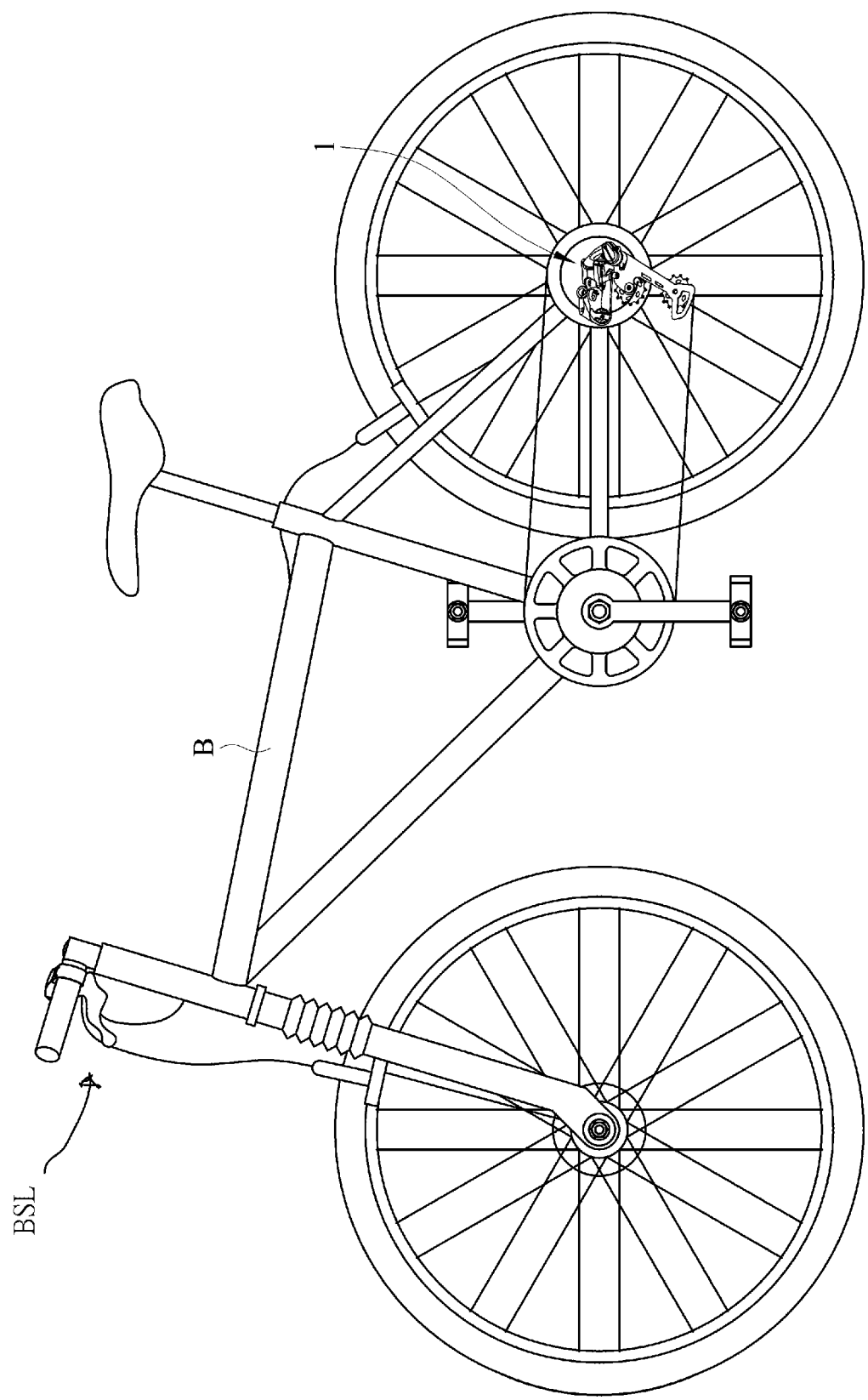
FIG. 3 illustrates a brief and schematic diagram showing a cable clamping mechanism mounted on a bicycle.

As shown in FIG. 3, the present application provides a cable clamping mechanism 1, which is preferably applied to a bicycle B. It is noted that this description uses the bicycle B as an exemplary embodiment (but not limited to this embodiment). Further, the special technical features of the present application does not relate to how the cable clamping mechanism 1 is mounted on the bicycle B. This mounting pertains to a common knowledge for a person having ordinary knowledge in the art, and thus this description would not elaborate any further.

Figure 4:
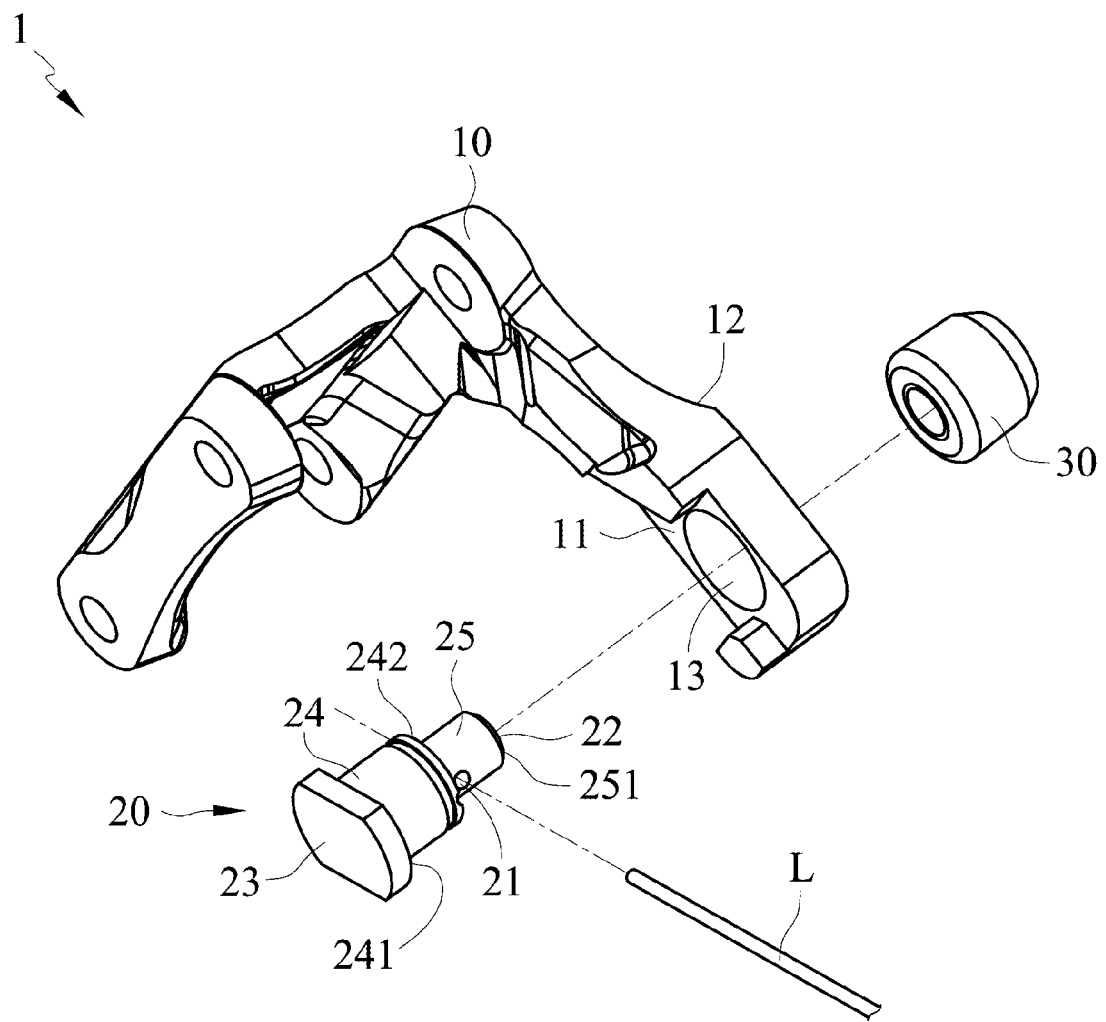
FIG. 4 illustrates an exploded diagram of the cable clamping mechanism according to an embodiment of the present application.
Figure 5:
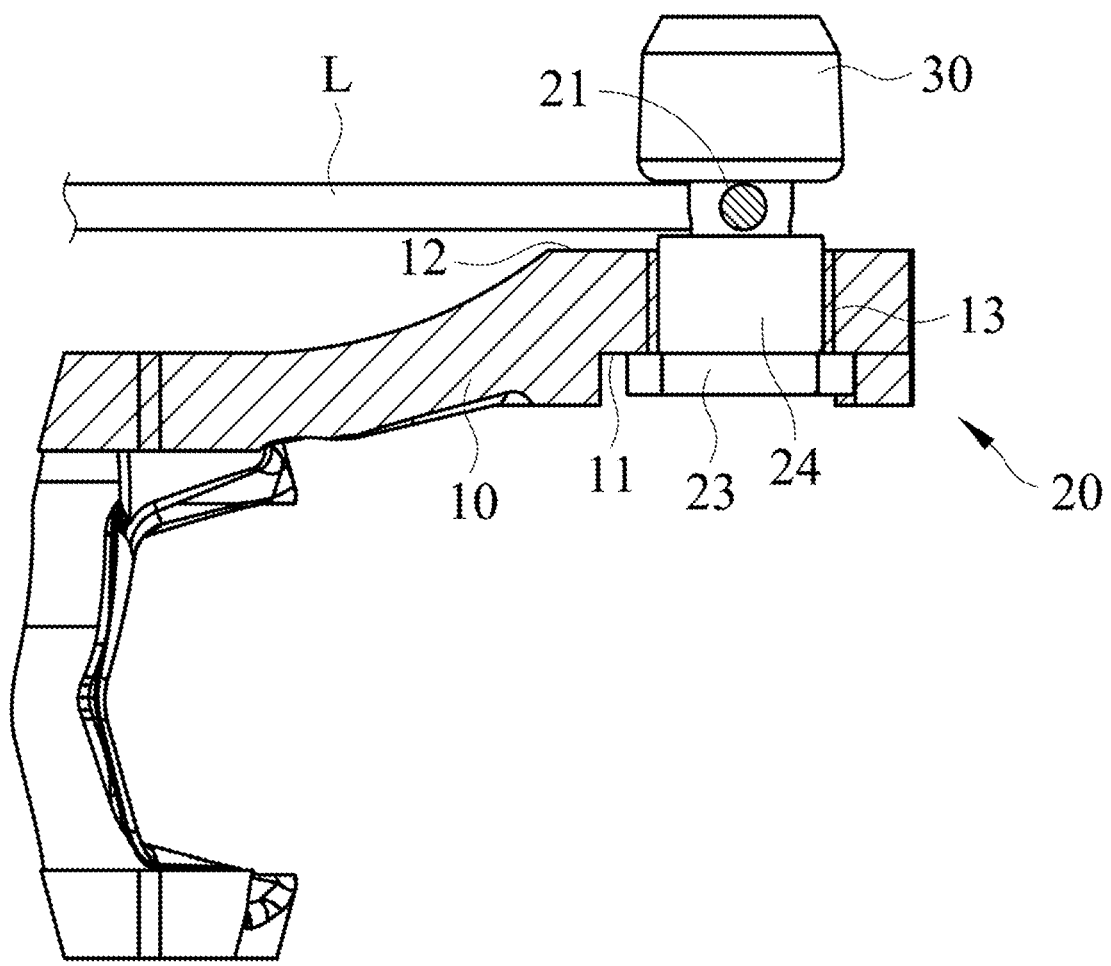
FIG. 5 illustrates a perspective and schematic diagram of the assembled cable clamping mechanism in FIG. 4.

Referring to FIG. 4 and FIG. 5, the cable clamping mechanism 1 of the present application comprises a linkage member 10, a fixing screw 20, a nut 30 and a linkage cable L. The linkage member 10 includes a first surface 11 and a second surface 12. A through hole 13 on the linkage member 10 passes through the first surface 11 and the second surface 12. The fixing screw 20 is disposed in the through hole 13, and includes a cable hole 21 passing through a radial direction of the fixing screw 20. The cable hole 21 is on a side of the second surface 12. The nut 30 joints a bottom end 22 of the fixing screw 20. The linkage cable L passes through the cable hole 21. The nut 30 presses against the linkage cable L so as to clamp the linkage cable L in the cable hole 21.

Figure 6:
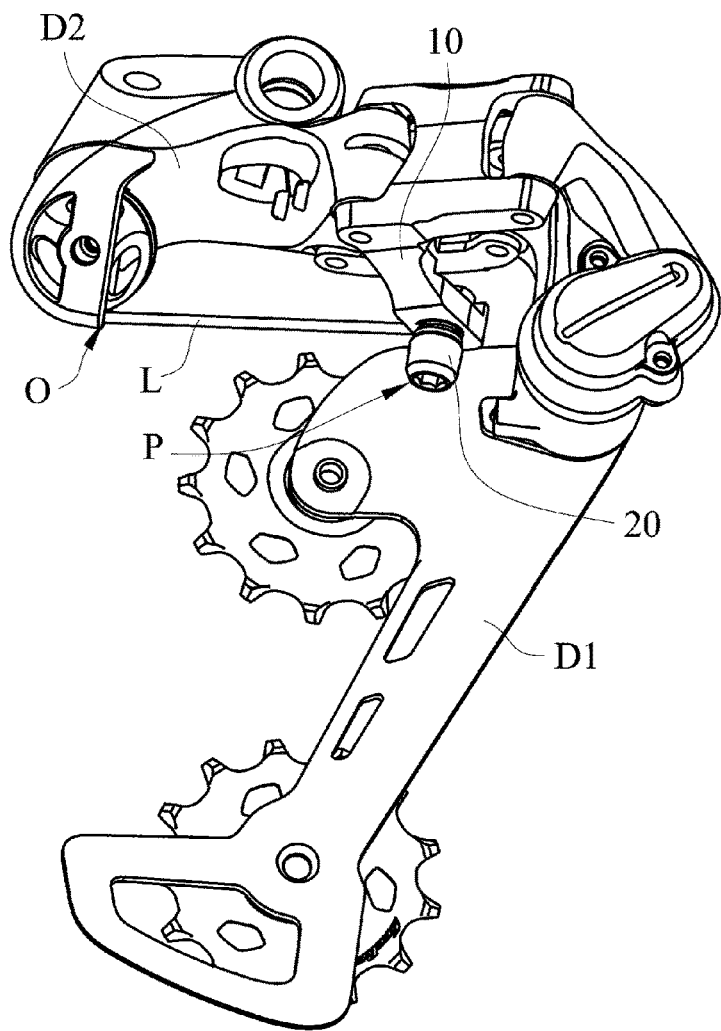
FIG. 6 illustrates a schematic diagram showing an action of the cable clamping mechanism according to the present application.
Figure 6:
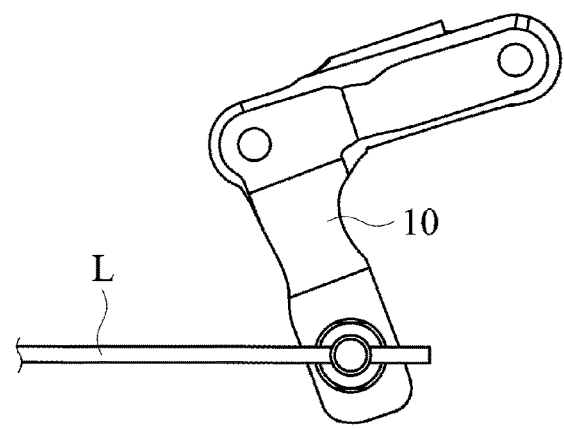
Figure 7:
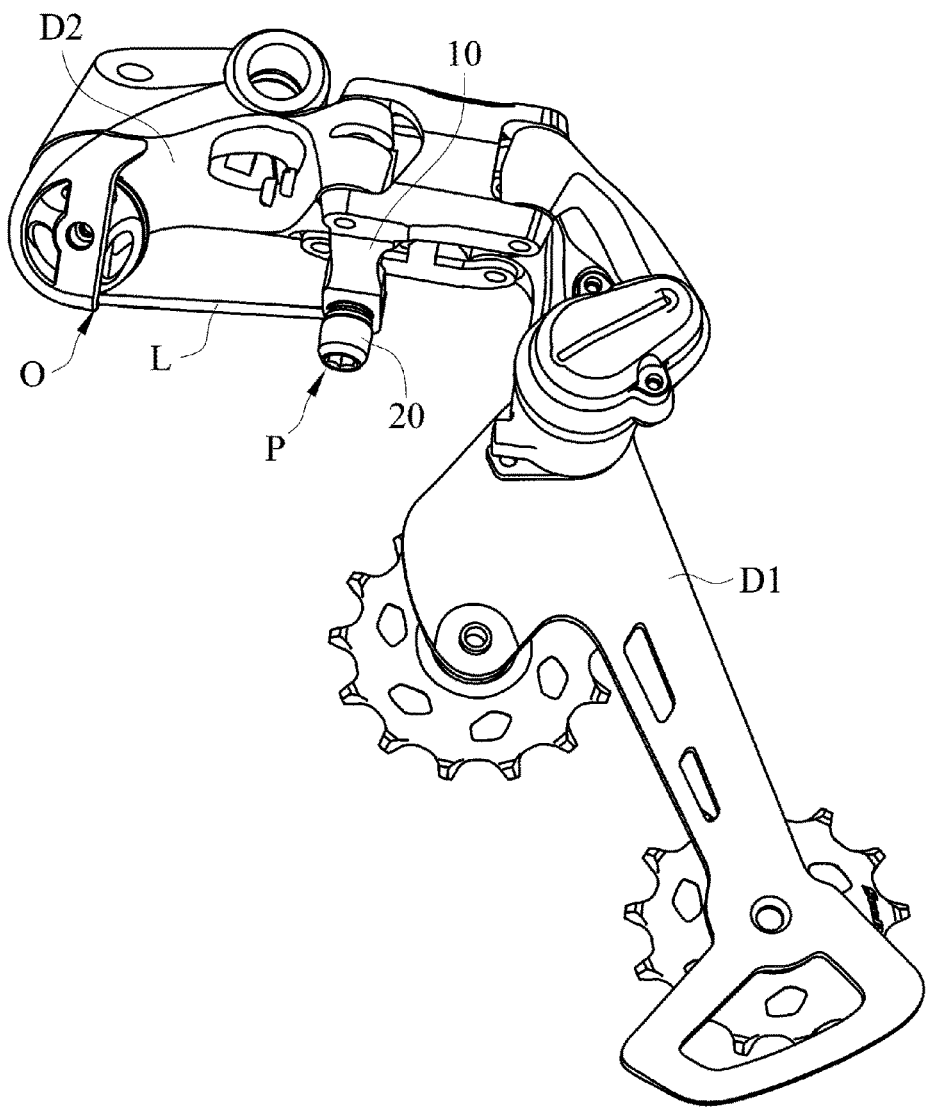
FIG. 7 illustrates a schematic diagram showing an action of the cable clamping mechanism according to the present application.
Figure 7:
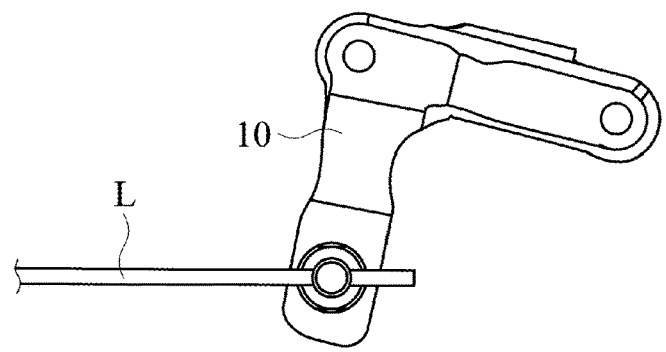

Please further refer to FIG. 6 and FIG. 7, in FIG. 6. The cable clamping mechanism 1 of the present application is connected to an outer chain guide D1 and a driving assembly D2, and the detail of the connection and the interaction between the both elements does not pertain to the special technical features of the present application, and thus this description would not elaborate any further. A person having ordinary knowledge in the art would understand that the linkage cable L passes through an exit point O of the driving assembly D2 and is connected to a pressing point P. This pressing point P is the position on where the fixing screw 20 on the linkage member 10 is disposed. For example, when the bicycle is shifting up or shifting down, the linkage cable L is tensioned or released to cause the whole driving assembly D2 and the outer chain guide D1 to displace (See FIG. 7). As shown in FIG. 6 and FIG. 7, the linkage member 10 has been rotated, and the fixing screw 20 also rotates in the through hole 13 in relative to the linkage member 10 to let the linkage cable L simultaneously rotate in relative to the linkage member 10. Thus, the linkage cable L is kept straight between the pressing point P and the exit point O and would not be bent. Consequently, the linkage cable L will not suffer too much wear to be unusable.

Further referring to FIG. 4 and FIG. 5, the fixing screw 20 of the present application further comprises a fixing member 23, a first cylinder 24 and a second cylinder 25. The fixing member 23 includes at least a portion with a dimension which is greater than the diameter of the through hole 13. The first cylinder 24 has a diameter adapted to the diameter of the through hole 13 and includes a first end 241 connected to the fixing member 23. The second cylinder 25 is connected to the second end 242 of the first cylinder 24. The cable hole 21 vertically passes through the second cylinder 25. The second cylinder 25 has an end 251 which is connected to the nut 30 and is away from the first cylinder 21. The fixing member 23 abuts against the first surface 11 when the fixing screw 20 passes through the through hole 13 from the first surface 11 of the linkage member 10, and the first cylinder 24 and the second cylinder 25 pass through the through hole 13.

Figure 8:
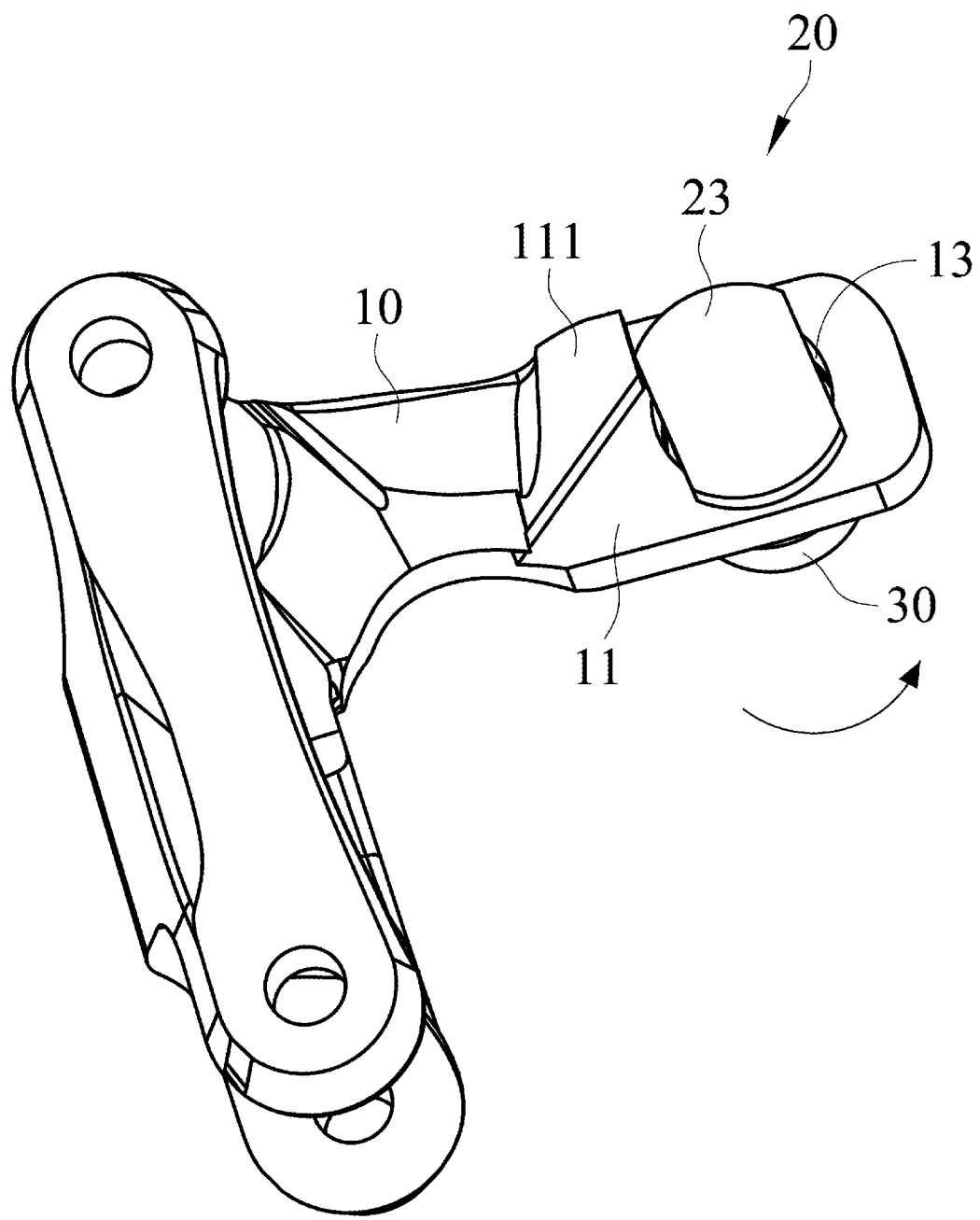
FIG. 8 illustrates a schematic diagram showing that a fixing screw is rotatable but is limited by a first stopper according to the present application.
Figure 9:
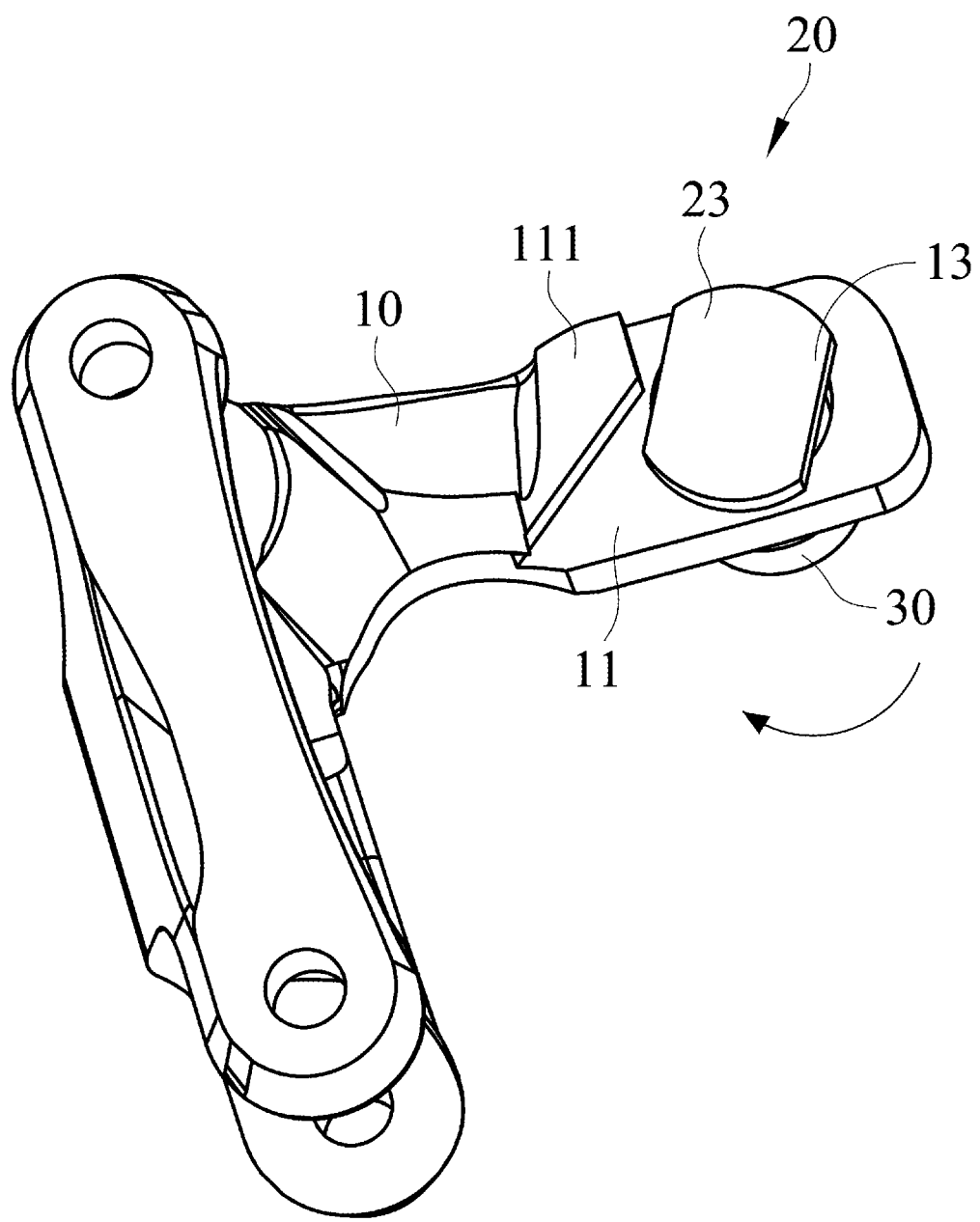
FIG. 9 illustrates a schematic diagram showing that a fixing screw is rotatable, but is limited by the first stopper according to the present application.

As shown in FIG. 8 and FIG. 9, the present application further comprises a first stopper 111 provided on the first surface 11 of the linkage member 10 and located on a side of the through hole 13 so that the fixing member 23 is in rotation (in both direction) which is limited by the first stopper 111 when the fixing screw 20 rotates clockwise or counterclockwise (as the arrow shown in the figure).

Figure 10:
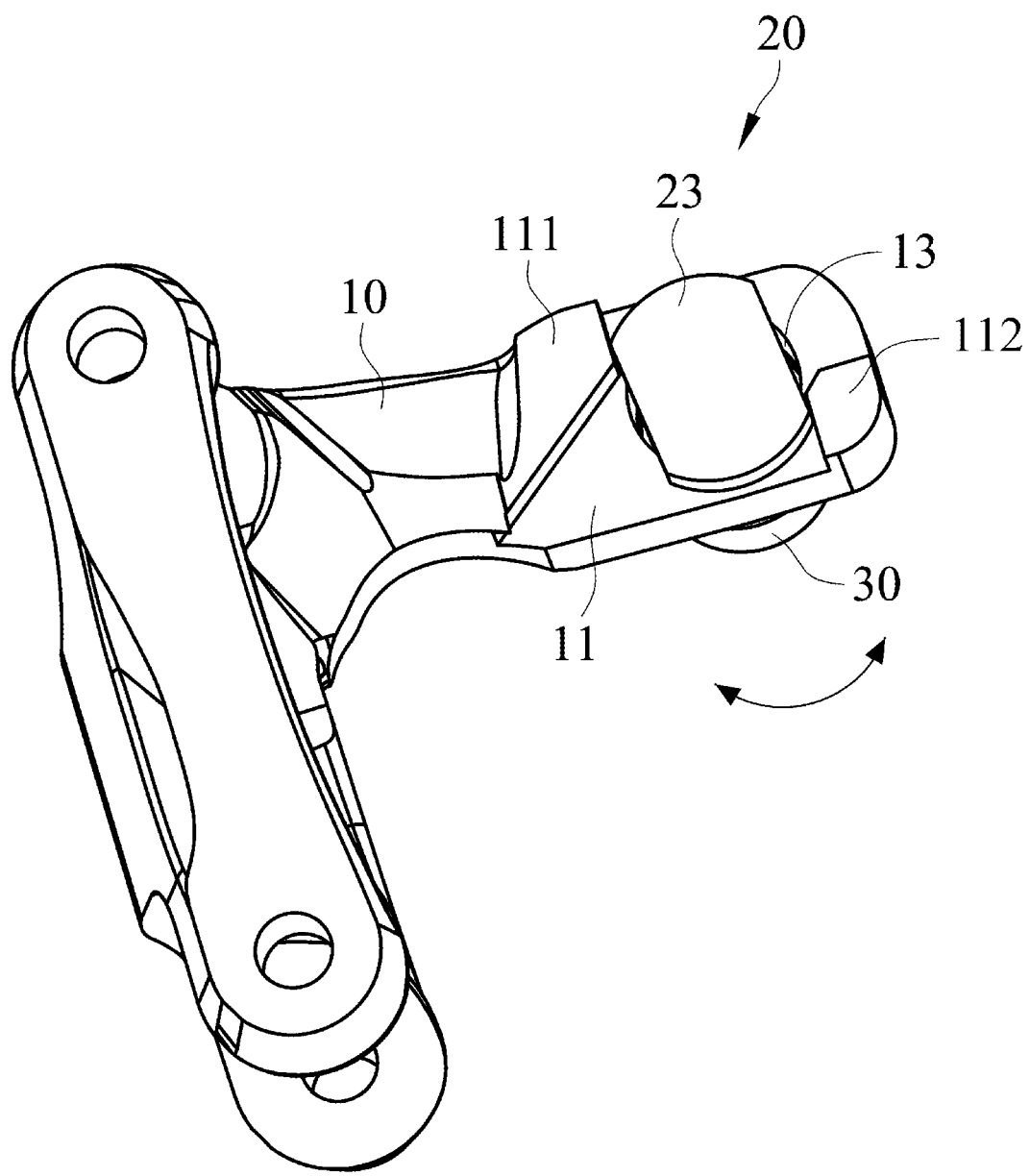
FIG. 10 illustrates a schematic diagram showing that a fixing screw is rotatable, but is limited by the first stopper and a second stopper according to the present application.

Referring to FIG. 10, the present application further comprises a second stopper 112 provided on a corner on the first surface 11 opposite to the first stopper 111 at another corner on the first surface 11 of the linkage member 10 so that the fixing member 23 is in rotation (in both direction) which is limited by the first stopper 111 and the second stopper 112 when the fixing screw 20 rotates clockwise or counterclockwise (as the arrow shown in the figure). Further explanation is made for this embodiment hereinafter. Because of the first stopper 111 and the second stopper 112 provided on the first surface 11, an user can rotate the nut 30 by a single hand when assembling the linkage cable L so as to fasten the nut 30 on the fixing screw 20 and then press against the linkage cable L to clamp the linkage cable L in the through hole 13. It is not necessary for the user to use the other hand to hold the fixing member 23 to avoid the free undesired rotation (following the force of rotation) of the fixing screw 20 in the through hole 13 (not shown in the figure). It means that it is advantageous for the user to mount the linkage cable L (the linkage cable L is not shown in FIG. 8-FIG. 10).

Figure 11:
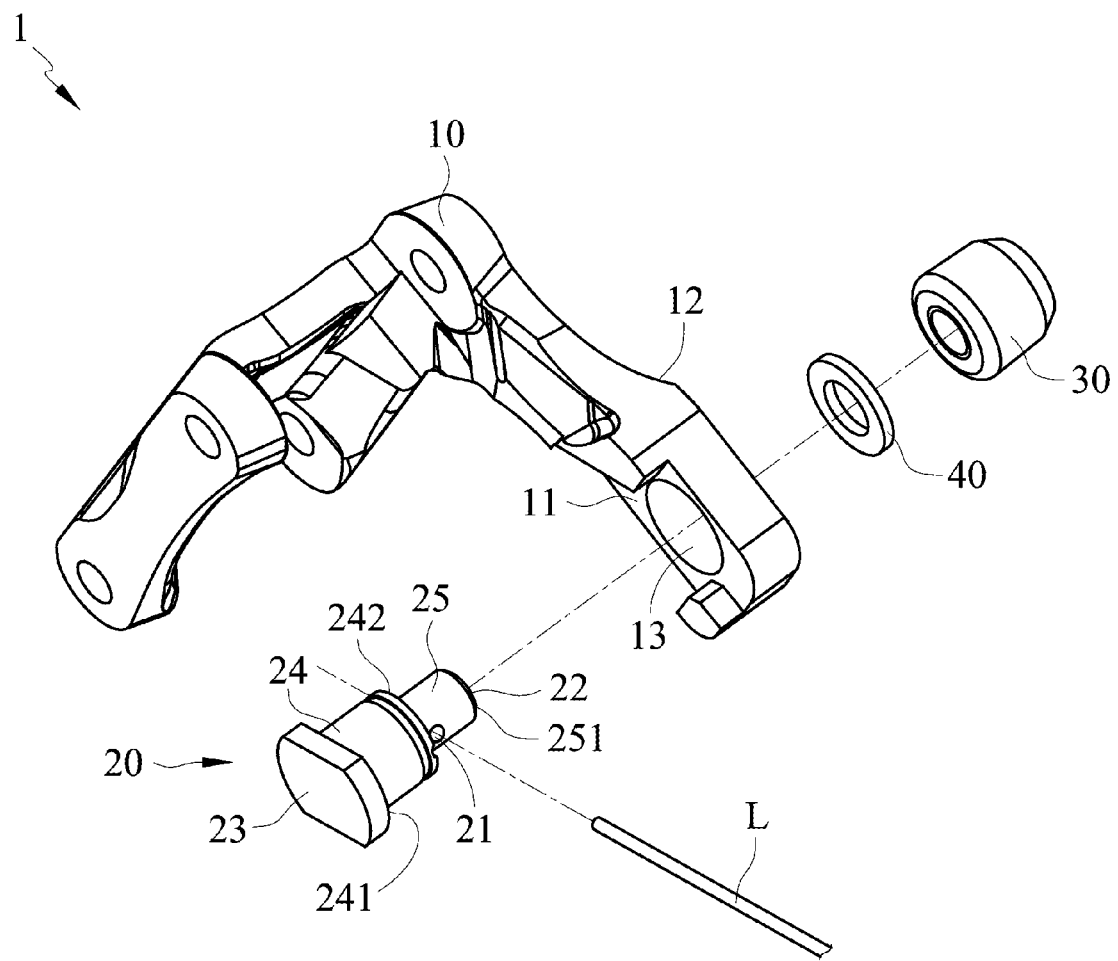
FIG. 11 illustrates an exploded diagram showing that a washer is provided for the cable clamping mechanism according to the present application.
Figure 12:
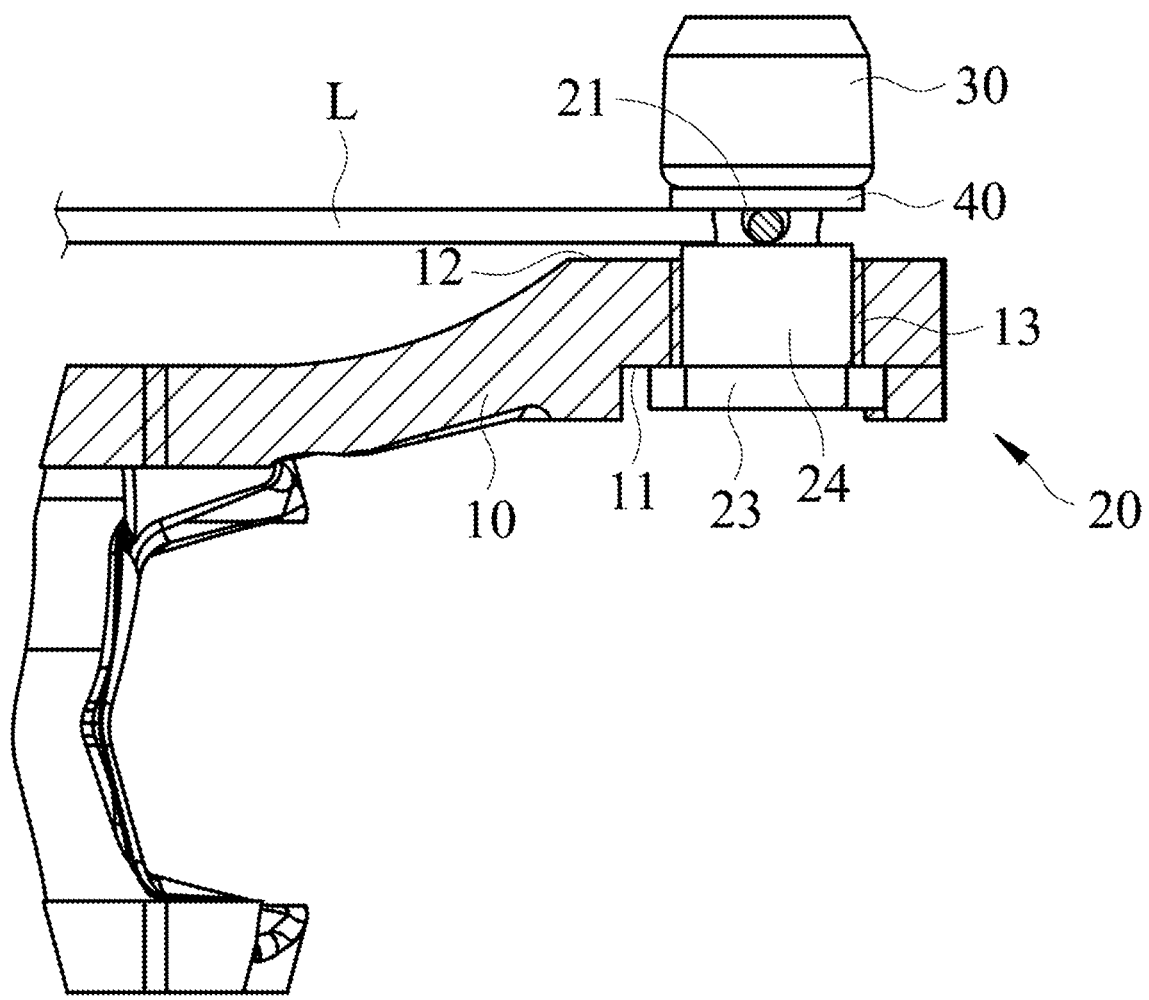
FIG. 12 illustrates a perspective diagram of the assembled cable clamping mechanism in FIG. 11.

As shown in FIG. 11 and FIG. 12, the present application further comprises a washer 40 disposed around the fixing screw 20 and abutting against the linkage cable L, the nut 30 pressing against the washer 40 and then pressing against the linkage cable L so as to clamp the linkage cable L within the cable hole 21. This embodiment provides a washer 40 (as a buffer) between the nut 30 and the linkage cable L to decrease the wear of the linkage cable L from the nut 30.

Figure 13:
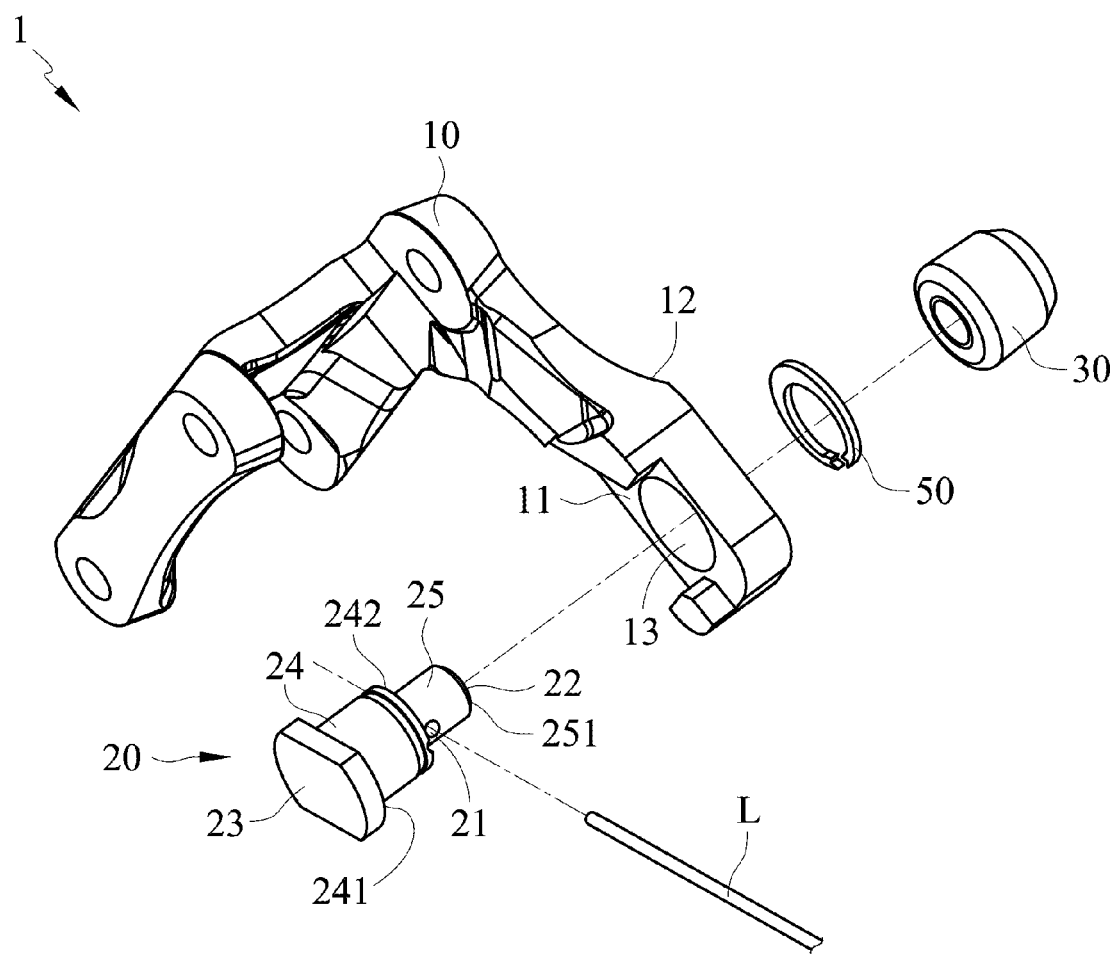
FIG. 13 illustrates an exploded diagram showing that a snap ring is provided for the cable clamping mechanism according to the present application.
Figure 14:
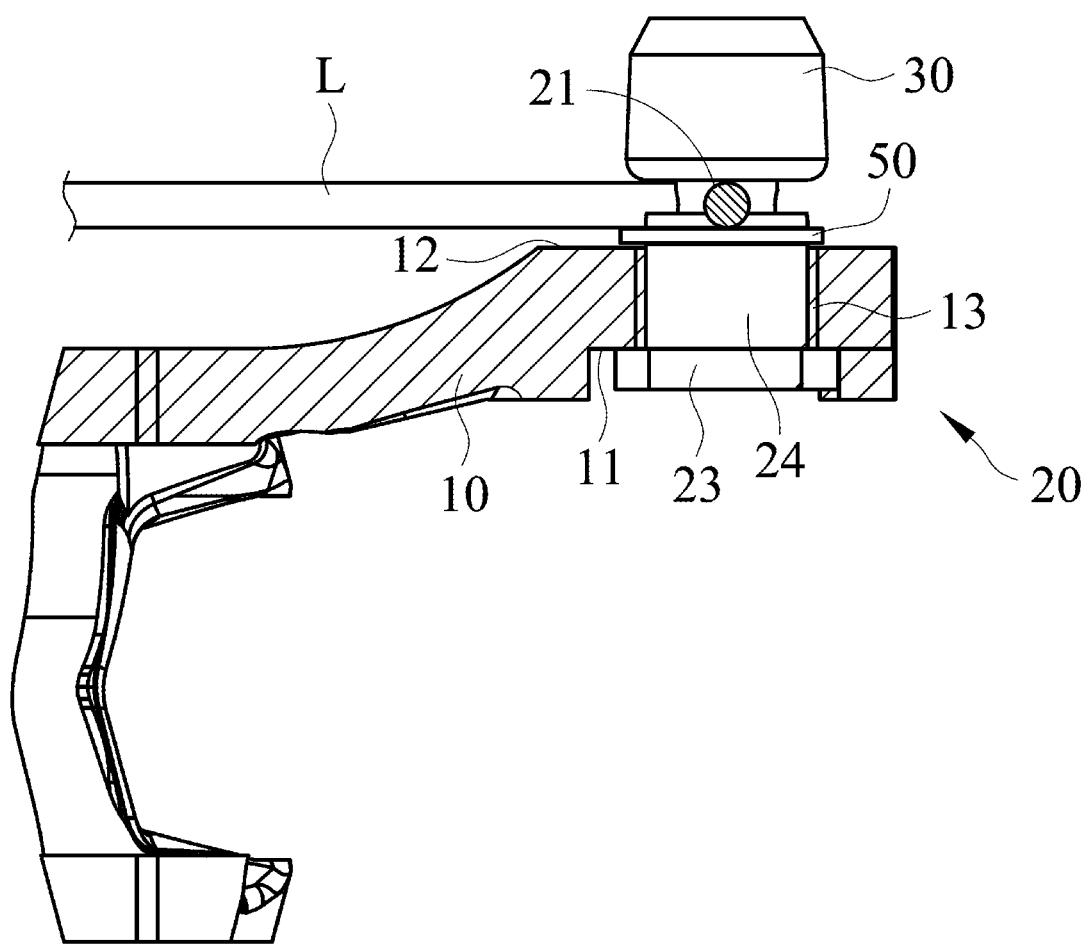
FIG. 14 illustrates a perspective diagram of the assembled clamping mechanism in FIG. 13.

As shown in FIG. 13 and FIG. 14, another embodiment of the present application further comprises a snap ring 50. The snap ring 50 is disposed around the fixing screw 20 and abuts against the second surface 12 of the linkage member 10. Preferably, the snap ring 50 is disposed around the first cylinder 24 of the fixing screw 20. Further explanation is made for this embodiment hereinafter. The snap ring 50 is disposed around the first cylinder 24 and abuts against the second surface 12 of the linkage member 10 so that the fixing screw 20 would not slide in the through hole 13 due to any effects on it. As shown in FIG. 14, the fixing member 23 of the fixing screw 23 and the snap ring 50 press the fixing screw 20 in the through hole 13, and thus the linkage cable L passing through the cable hole 21 will not fall into the through hole 13 due to the slide.

Figure 15:
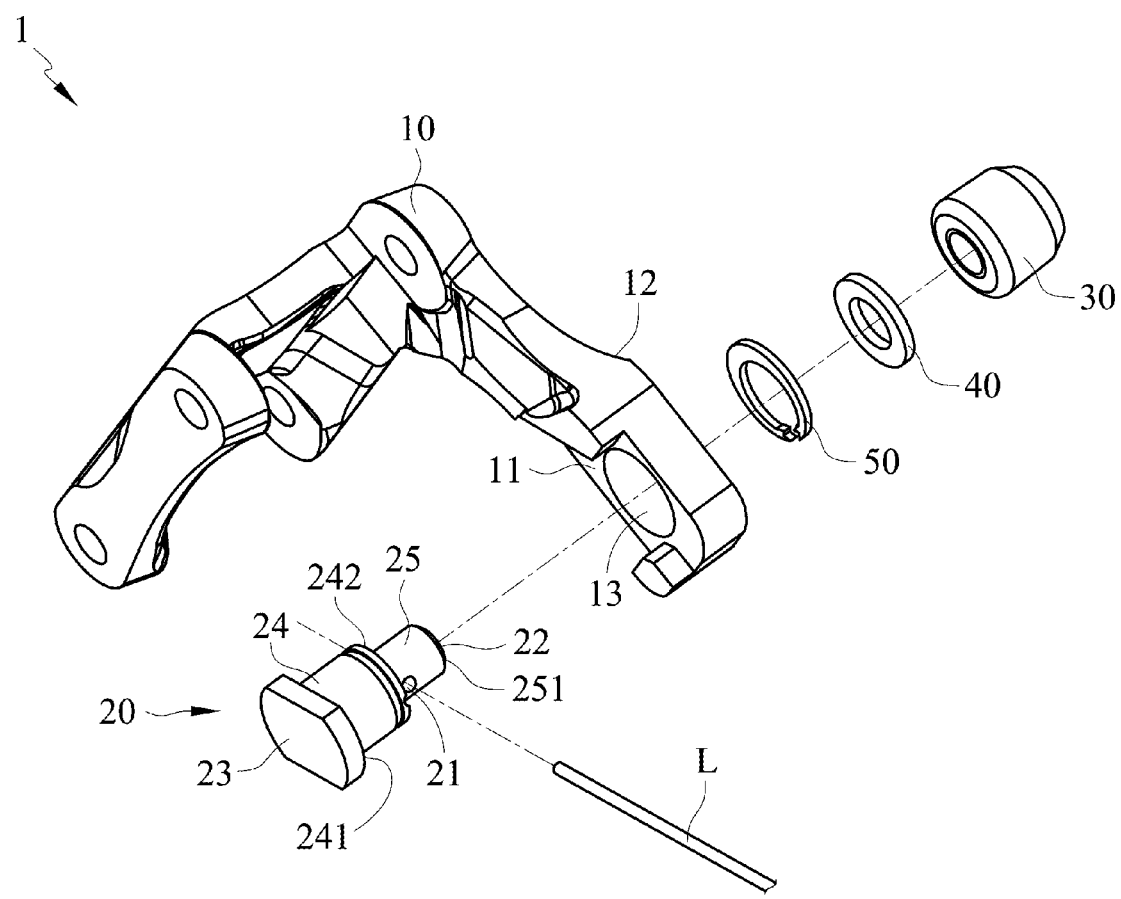
FIG. 15 illustrates an exploded diagram showing that the washer and the snap ring are provided for the clamping mechanism according to the present application.
Figure 16:
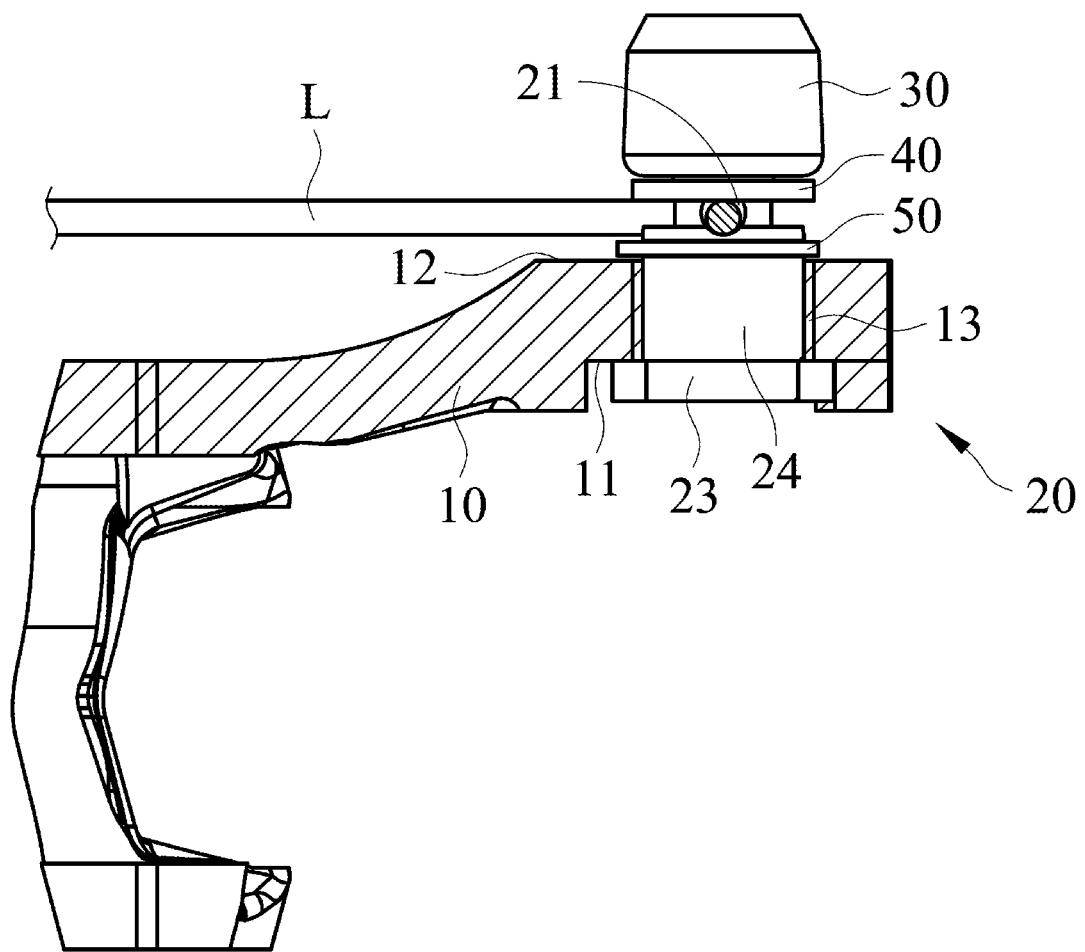
FIG. 16 illustrating a perspective diagram of the assembled cable clamping mechanism in FIG. 15.

In addition, as shown in FIG. 15 and FIG. 16, another embodiment of the present application shows an example that the washer 40 and the snap ring 50 are disposed around the fixing screw 20, preferably around the first cylinder 24. The washer 40 abuts against the linkage cable L since the nut 30 presses against the washer 40, and the snap ring 50 abuts against the second surface 12 of the linkage member 10. The linkage cable L is in the position between the washer 40 and the snap ring 50.

Figure 17:
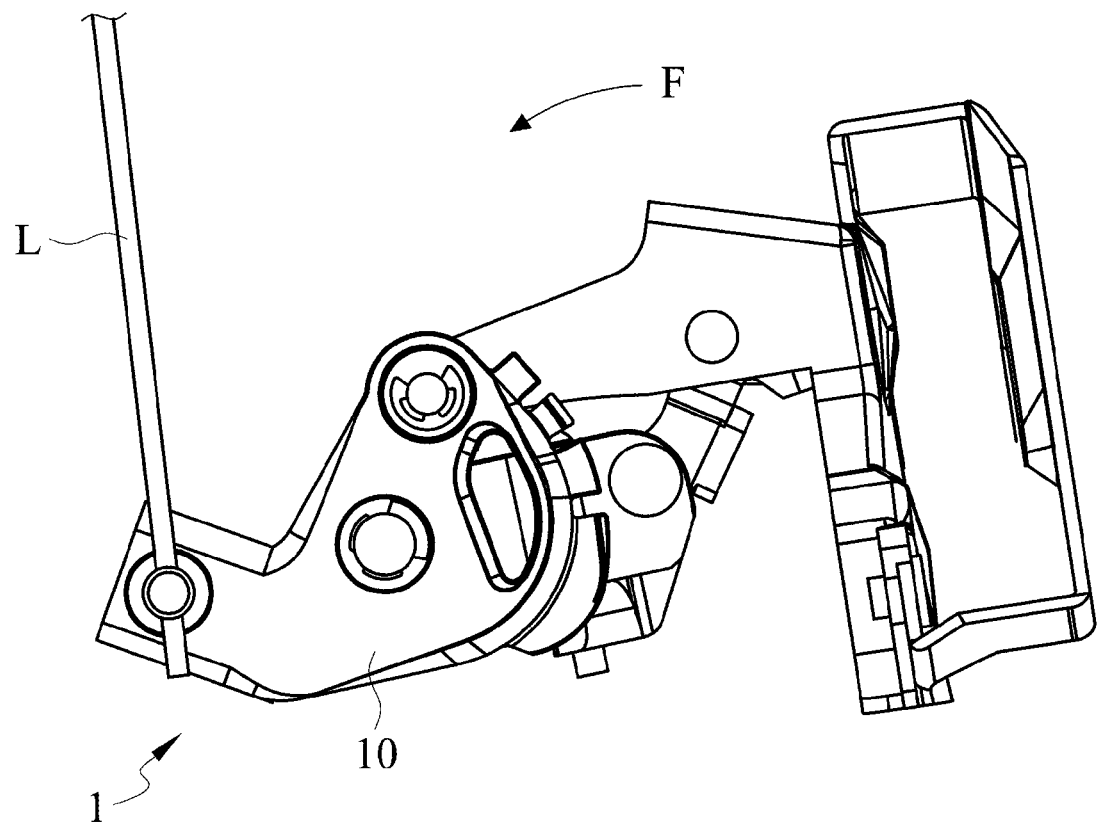
FIG. 17 illustrates a schematic diagram showing that the cable clamping mechanism is used in the derailleur device of a front wheel according to an embodiment of the present application.

The following are further examples of the embodiments of this application. The cable clamping mechanism 1 of the present application can not only be applied to the bicycle B but also be applied to various bicycle B assemblies. As sown in FIG. 6 and FIG. 7, the embodiments in these two figures present that the cable clamping mechanism 1 is applied to a rear derailleur device of the derailleur of the bicycle B. In this embodiment, the linkage cable L is a derailleur cable. An end of this derailleur cable is at the pressing point P and another end extends to a bicycle shift lever BSL (shown in the FIG. 3) from the exit point O. The linkage member 10 is a bicycle derailleur driving linkage. In an alternative embodiment, the cable clamping mechanism 1 can be applied to a front derailleur device F (as shown in FIG. 17) of the derailleur of the bicycle B. The linkage member 10 in FIG. 17 is a front derailleur (i.e., a bicycle shift lever BSL). An end of this linkage cable L (derailleur cable) is at the pressing point P and another end is connected to the bicycle shift lever BSL (as stated above). The technical features of cable clamping mechanism 1 of the front derailleur device F shown in FIG. 17 are identical to the technical features stated above, and a person having ordinary knowledge in the art would understand and thus this description would not elaborate any further.

Figure 18:
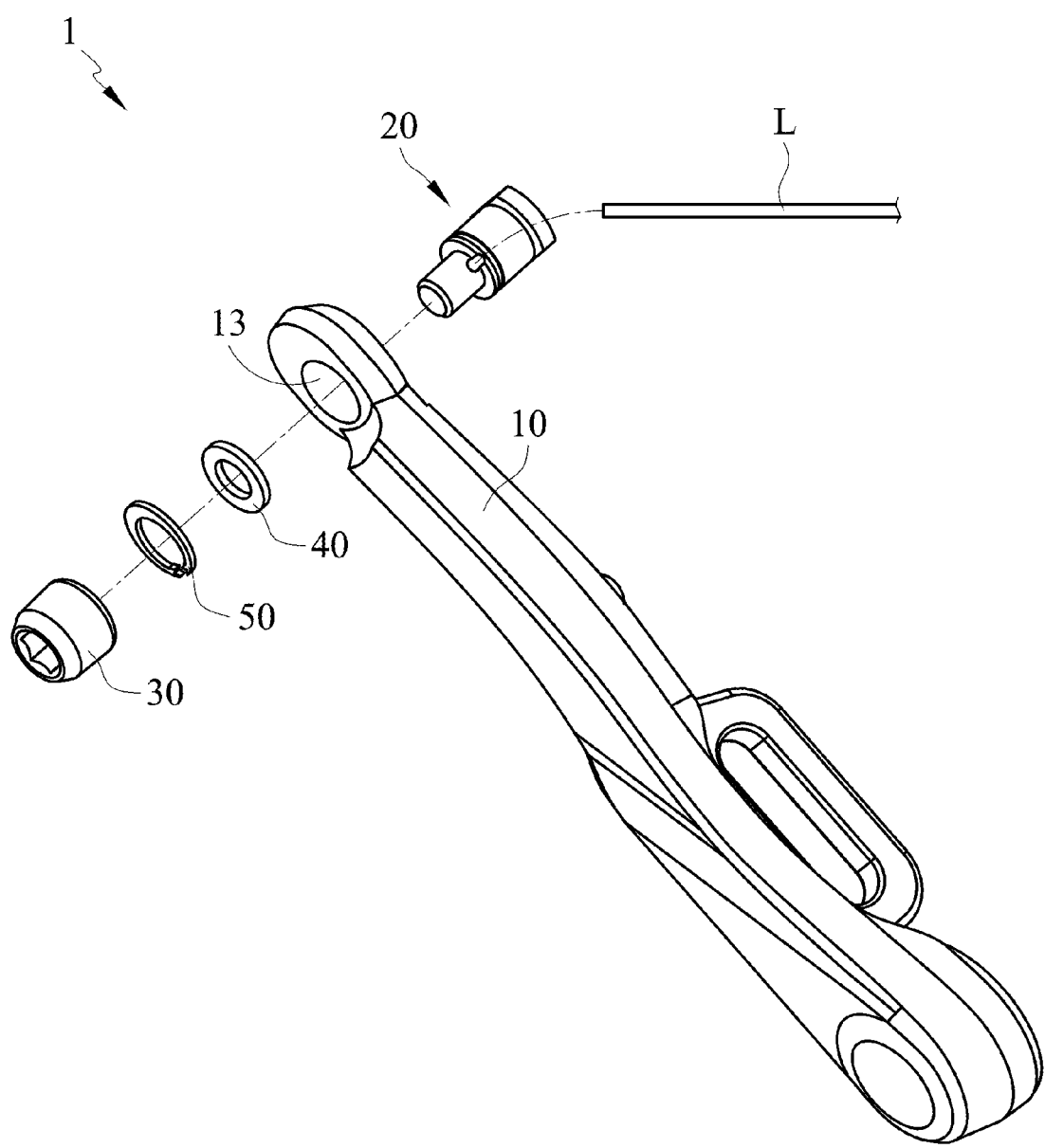
FIG. 18 illustrates a schematic diagram showing that the cable clamping mechanism is used in a brake lining clamp according to another embodiment of the present application.

Please further refer to FIG. 18, as stated in the previous corresponding paragraph. The cable clamping mechanism 1 of the present application can also be applied to a brake device of the bicycle B. The linkage member 10 in FIG. 18 can be regarded as a bicycle brake clamp. The fixing screw 20 is provided in the through hole 13 of the linkage member 10, and the washer 40 and the snap ring 50 are disposed around the fixing screw 20. The linkage cable L passes through the fixing screw 20 and be fastened by the nut 30. In this embodiment, the linkage cable L is a brake cable.

Figure 19:
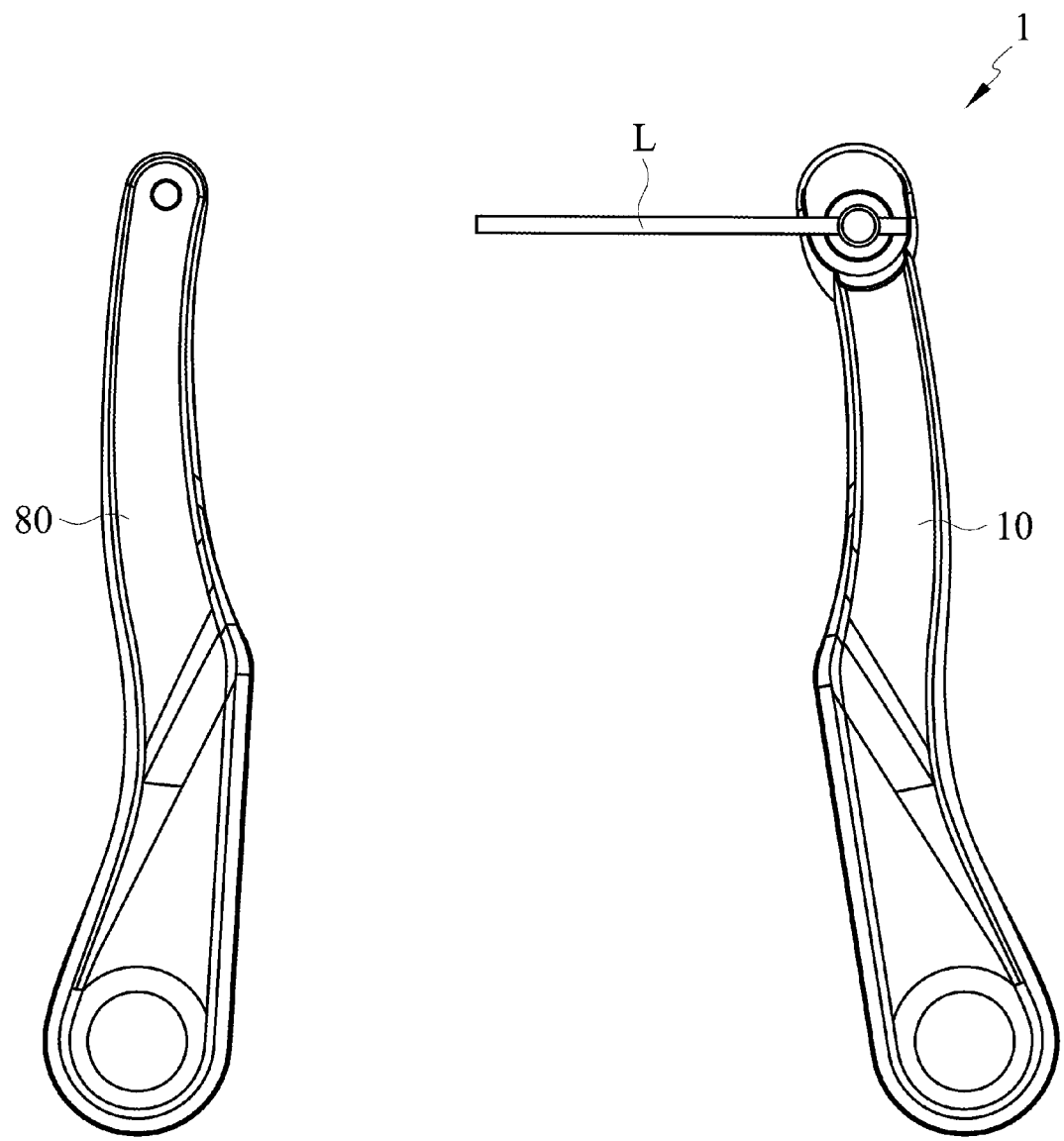
FIG. 19 illustrates a schematic diagram showing that the cable clamping mechanism acts in the brake lining clamp.
Figure 20:
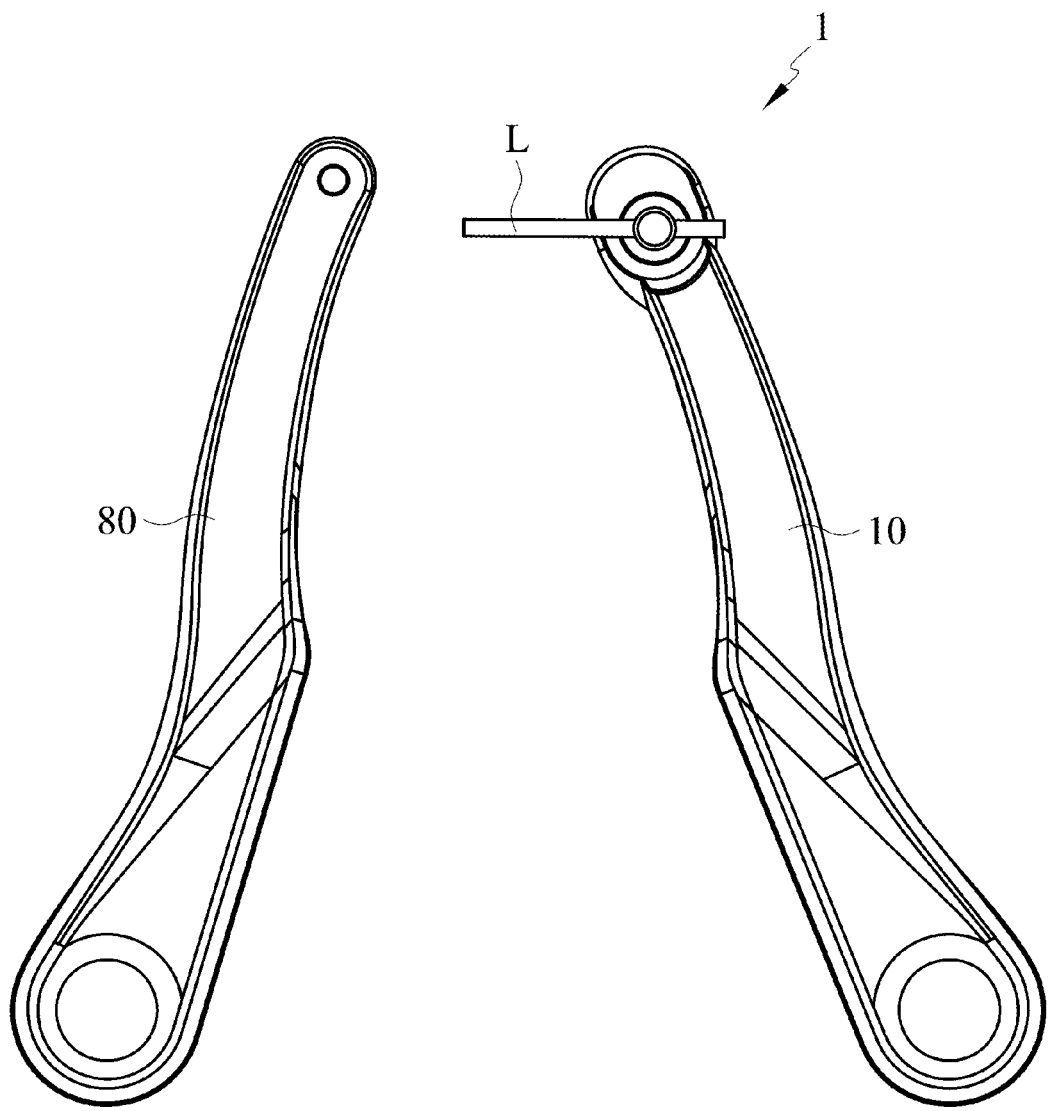
FIG. 20 illustrates a schematic diagram showing that the cable clamping mechanism acts in the brake lining clamp.

As shown in FIG. 19 and FIG. 20, these two figures illustrate the actions of the assembled cable clamping mechanism 1 in FIG. 18. An end of the linkage cable L in FIG. 19 is at the pressing point P, and another end is connected to the bicycle brake lever (not shown in the figure). When the user actuates the brake, the linkage cable L (the brake cable) is driven so as to drive the linkage member 10 (the bicycle brake clamp), and thus the distance between the linkage member 10 (the bicycle brake clamp) and another linkage member 80 (another bicycle brake clamp) is shortened in order to brake a bicycle. The embodiments (See FIG. 18-FIG. 20) in the preceding two paragraphs merely take the bicycle brake device as an example, and the technical features of the cable clamping mechanism 1 are identical to the technical features stated above, and thus this description would not elaborate any further.

The aforesaid embodiments describe the present application. A person having ordinary knowledge in the art will easily understand the present application due to the description stated above. However, the present application is not limited by the technical features described in the above embodiments, and those of skill in the art will understand that various combinations and modifications based on the embodiments in this description may be made without departing from the full scope and spirit of the present application.

What is claimed is:

1. A cable clamping mechanism for a bicycle, comprising:
   a linkage member including a through hole, the linkage member including a first surface and a second surface, the through hole passing through the first surface and the second surface;
   a fixing screw provided in the through hole, the fixing screw including a cable hole passing through a radial direction of the fixing screw, the cable hole being on a side of the second surface;
   a nut jointing a bottom end of the fixing screw; and
   a linkage cable passing through the cable hole;
   wherein the nut presses against the linkage cable so as to clamp the linkage cable in the cable hole, wherein the fixing screw is configured to rotate within the through hole relative to the linkage member to cause the linkage cable to simultaneously rotate relative to the linkage member when the linkage cable is pressed upon the nut.

2. The cable clamping mechanism according to claim 1, wherein the fixing screw further comprising:
   a fixing member including at least a portion with a dimension which is greater than a diameter of the through hole;
   a first cylinder with a diameter adapted to the diameter of the through hole, the first cylinder including a first end connected to the fixing member; and
   a second cylinder connected to a second end of the first cylinder, the cable hole vertically passing through the second cylinder, the second cylinder having an end which is connected to the nut and is away from the first cylinder;
   wherein the fixing member abuts against the first surface when the fixing screw passes through the through hole from the first surface of the linkage member, and wherein the first cylinder and the second cylinder pass through the through hole.

3. The cable clamping mechanism according to claim 2, further comprising a first stopper provided on the first surface and located on a side of the through hole so that the fixing member is in rotation which is limited by the first stopper when the fixing screw rotates.

4. The cable clamping mechanism according to claim 3, further comprising a second stopper provided on a corner on the first surface opposite to the first stopper at another corner on the first surface so that the fixing member is in rotation which is limited by the first stopper and the second stopper when the fixing screw rotates.

5. The cable clamping mechanism according to claim 1, further comprising a washer disposed around the fixing screw and abutting against the linkage cable, the nut pressing against the washer and then pressing against the linkage cable so as to clamp the linkage cable within the cable hole.

6. The cable clamping mechanism according to claim 1, further comprising a snap ring, wherein the snap ring is disposed around the fixing screw and abuts against the second surface of the linkage member.

7. The cable clamping mechanism according to claim 2, further comprising a snap ring, wherein the snap ring is disposed around the first cylinder of the fixing screw and abuts against the second surface of the linkage member.

8. The cable clamping mechanism according to claim 5, further comprising a snap ring, wherein the snap ring is disposed around on the fixing screw and abuts against the second surface of the linkage member.

9. The cable clamping mechanism according to claim 1, wherein the linkage cable is a derailleur cable.

10. The cable clamping mechanism according to claim 9, wherein an end of the derailleur cable is connected to a bicycle shift lever.

11. The cable clamping mechanism according to claim 10, wherein the linkage member is a bicycle derailleur driving linkage.

12. The cable clamping mechanism according to claim 1, wherein the linkage cable is a brake cable.

13. The cable clamping mechanism according to claim 12, wherein an end of the brake cable is connected to a bicycle brake lever.

14. The cable clamping mechanism according to claim 13, wherein the linkage member is a bicycle brake clamp.

15. The cable clamping mechanism according to claim 3, wherein a clockwise rotation and a counterclockwise rotation of the fixing member are limited by the first stopper.

16. The cable clamping mechanism according to claim 4, wherein a clockwise rotation and a counterclockwise rotation of the fixing member are limited by the first stopper and the second stopper.

17. The cable clamping mechanism according to claim 7, wherein the fixing member and the snap ring fasten the fixing screw in the through hole.

18. The cable clamping mechanism according to claim 8, wherein the linkage cable is between the washer and the snap ring.

19. The cable clamping mechanism according to claim 4, further comprising a washer disposed around the fixing screw and abutting against the linkage cable, wherein the nut presses against the washer and pressing against the linkage cable so as to clamp the linkage cable within the cable hole.

20. The cable clamping mechanism according to 19, further comprising a snap ring, wherein the snap ring is disposed around the first cylinder of the fixing screw and abuts against the second surface of the linkage member.

* * * * *